United States Patent
McEachern et al.

(10) Patent No.: US 7,234,000 B2
(45) Date of Patent: Jun. 19, 2007

(54) SYSTEM AND METHOD OF DOWNLOADING CONFIGURATION DATA FROM A CENTRAL LOCATION TO COMPONENTS FOR A COMMUNICATION SWITCH

(75) Inventors: William Ross McEachern, Kanata (CA); Aaron Matthew Willis Brumpton, Ottawa (CA); Steven William Buchko, Kanata (CA)

(73) Assignee: Alcatel Canada Inc., Kanata (CA)

(*) Notice: Subject to any disclaimer, the term of this patent is extended or adjusted under 35 U.S.C. 154(b) by 816 days.

(21) Appl. No.: 10/302,914

(22) Filed: Nov. 25, 2002

(65) Prior Publication Data
US 2003/0154301 A1 Aug. 14, 2003

(30) Foreign Application Priority Data
Jan. 24, 2002 (CA) ................................. 2369196

(51) Int. Cl.
*G06F 15/16* (2006.01)
(52) U.S. Cl. .................................. 709/235; 709/232
(58) Field of Classification Search ............... 709/232, 709/235
See application file for complete search history.

(56) References Cited

U.S. PATENT DOCUMENTS

| | | | | |
|---|---|---|---|---|
| 5,727,002 A * | 3/1998 | Miller et al. | ................ | 714/748 |
| 5,923,662 A * | 7/1999 | Stirling et al. | ............... | 370/432 |
| 6,269,080 B1 * | 7/2001 | Kumar | ....................... | 370/236 |
| 6,335,933 B1 * | 1/2002 | Mallory | ...................... | 370/394 |
| 6,505,253 B1 * | 1/2003 | Chiu et al. | ................... | 709/235 |
| 6,693,907 B1 * | 2/2004 | Wesley et al. | ............... | 370/390 |
| 6,904,464 B1 * | 6/2005 | Van Langen et al. | ....... | 709/237 |
| 7,035,217 B1 * | 4/2006 | Vicisano et al. | ............ | 370/236 |
| 7,035,258 B2 * | 4/2006 | Alam et al. | .................. | 370/390 |
| 2004/0049593 A1 * | 3/2004 | Kalyanaraman et al. | .... | 709/235 |

FOREIGN PATENT DOCUMENTS

EP 1 128 591 8/2001

OTHER PUBLICATIONS

Speakman, et al. "PGM Reliable Transport Protocol Specification", Dec. 2001, The Internet Society, RFC 3208.*

(Continued)

*Primary Examiner*—Bunjob Jaroenchonwanit
*Assistant Examiner*—Julian Chang
(74) *Attorney, Agent, or Firm*—McCarthy Tetrault LLP

(57) ABSTRACT

A router is disclosed for use in a network to carry data packets therein. Each router provides a hop along a path through the network extending from a source network address node to a destination network address node. Each route for routing data packets contains a destination network address to a next successive hop along a path between the source network address and the destination network address. Each router has a central routing processor in communication with its forwarders over a control medium to provide routing tables to each forwarder defining the next hop for forwarding received data packets for each destination address. Routing table updates of the forwarders by the central routing processor are sequentially downloaded to all forwarders simultaneously from the central routing processor, using a negative acknowledgement protocol. The central routing processor selectively responds to a negative acknowledgement message from a forwarder to re-transmit routing table updates.

12 Claims, 8 Drawing Sheets

OTHER PUBLICATIONS

Whetten, Brian, Taskale, Gursel "An Overview of Reliable Multicast Transport Protocol II" IEEE Network-Jan./Feb. 2000, pp. 37-47, XP-002270667.

Vasconcelos, R. et al "Reliable Data Distribution Using Multicast Groups in Industrial Systems", Industrial Electronics, 1998. Proceedings. ISIE '98. IEEE International Symposium on Pretoria, South Africa Jul. 7-10, 1998, New York, NY, USA, IEEE, US Jul. 7, 1998, pp. 690-693, XP0101296092.

Yamamoto M. et al: "Nak-Based Flow Control Scheme for Reliable Multicast Communications" IEEE Globecom 1998, Globecom '98. The Bridge to Global Integration. Sydney, Nov. 8-12, 1998, IEEE Global Telecommunications Conference, New York, NY IEEE, US, vol. 5, 1998, pp. 2611-2616. XP000901521, ISBN: 0-7803-4985-7.

Liao, T. "Light-weight Reliable Multicast Multicast Protocol", INRIA Rocquencourt (date and publication unkown).

Liao, T. "Light-weight Reliable Multicast Protocol as an Extension to RTP", INRIA Rocquencourt (date and publication unknown).

Cooperstock, J. and Kotsopoulos, S. "Why Use a Fishing Ling When You Have a Net? An Adaptive Multicast Data Distribution Protocol", University of Toronto (1996 USENIX Technical Confrerence Proceedings).

* cited by examiner

SYSTEM AND METHOD OF DOWNLOADING CONFIGURATION DATA FROM A CENTRAL LOCATION TO COMPONENTS FOR A COMMUNICATION SWITCH

FIELD OF THE INVENTION

The invention relates to a system and method of downloading configuration data from a central location in a communication switch to components in the communication switch.

BACKGROUND OF INVENTION

Communications networks are formed from an interconnection of network switch equipment over communications channels. The communications channels include a variety of physical implementations using radio, optical, and electrical signalling. With increasing frequency, network implementations provide differing communications technologies operating over one communications channel. For example, electrical communication over telephone outside plant can include analogue telephone signalling, or plain old telephone service (POTS) and digital data signalling, also referred to as digital subscriber line signalling. Even within a class or category of communication, such as digital data signalling, there are many forms of signalling which are supported and governed by a respective standard promulgated by a standards body recognised in the industry. There are divergent requirements placed on communication networks to transport particular types of traffic on a circuit switched, that is connection based or fixed bandwidth communications paradigm, or packet switched, that is connectionless or traffic based communications paradigm. These include the transport of data, streaming real time audio and visual data streams as well as traditional plain old telephone service voice traffic. Consequently there are a diversity of networks each of which is standards driven that increase the complexity of providing a network infrastructure to support the increasing traffic loads and expanding protocol universe resulting in ever-increasing demands on network operators and carriers to stay current while supporting legacy communication systems.

Intelligent optical networking is driving new network architectures in both the metro and core of the network to support these communications demands. An emerging protocol that provides interoperability between connection based and connectionless communications is multi-protocol label switching (MPLS). MPLS is an example of a technology that permits bridging the asynchronous transfer mode (ATM) and the Internet protocol (IP) network architectures. Communications over a network requires delivery of data from a source to a destination, which is the function of the network switch to provide. Within a network switch, traffic is routed from an ingress point to an egress point. Traffic switching can occur at more than one location of a switch, for example within the switch core or fabric or at the switch line card level, which interconnects the switch to the communication network channels.

In a communication switch, ingress and egress forwarders or line cards require routing information for every destination address in a communication network. As the communication network adds and loses connections to other communication elements, the routing information changes and this is a dynamic circumstance of network traffic and a consequence of adding or removing nodes and links to the network. The routing information is frequently stored locally in memory in the ingress and egress line cards. The routing information is provided to each line card from a central location in the communication switch. As the number of line cards in a communication switch increases, the task of downloading the routing information to each line card requires more bandwidth and processing resources of the communication switch.

In the past, a central routing processor in a router with multiple forwarders, for example an IP routing processor, updates routing tables used by the forwarders. In the embodiment, each forwarder is located on a respective line card. The central routing processor accesses a central table of routes and transmits routing updates from this table to the forwarders to update their respective routing tables. The forwarders are accessed in sequence to update their routing tables. A forwarder may become too busy to respond resulting in delay. Updating proceeds one forwarder at a time at a rate for each forwarder that corresponds to its capabilities and load. The total time to update N forwarders is N times the average update time for the group of forwarders. Where route updates are constantly being made due to network traffic flows and other dynamic considerations such as additions of network nodes and links, the total time to update imposes limits to scalability by introducing traffic overhead inefficiencies, routing errors and retry attempts.

There is a need for a system and method that can efficiently provide the routing information from the central location to the line cards.

SUMMARY OF INVENTION

The invention relates to downloading information, such as routing tables in a router, from a server, such as a central routing processor, to a series of associated clients, such as forwarder cards. In the case of a multi-shelf router, the forwarding cards may reside on multiple shelves. More particularly the invention addresses the problem of efficiently updating the forwarder cards with routing updates in a manner that supports an architecture that is highly scalable in the number of forwarder cards supported. Still further, the invention addresses this problem where forwarder cards can be of different types and software versions and protocols.

The present invention provides a novel method to reduce route update times resulting in greater routing scalability and efficiencies.

In accordance with an aspect of the invention, a routing processor communicates routing table updates to forwarders in a multicast manner. In one embodiment, Ethernet multicasting is used as the method to transport routing table updates to the forwarders. Line cards which are not designed to act as forwarders do not listen to the multicast address used to distribute routing table update messages, and consequently, these cards never receive routing table messages. An indication field is also provided in each message that is used to indicate the routing table update messages which are consequently identified to be processed by each recipient as a routing table download or update. Preferably, the indication field is independent of the transport mechanism and consequently not dependent on an Ethernet network to perform its function.

In a second aspect, the invention provides a method of distributing information from a server to clients. The method involves (a) transmitting the information in a sequenced multicast packets to the clients of the server; (b) tracking of a status of each client; (c) in response to receiving a negative acknowledgement message from a client, evaluating the status of the client and if the status indicates that the client is active, then re-transmitting to the clients a portion of the sequenced multicast packets starting with a multicast packet indicated in the negative acknowledgement message.

The method may have each client as being a forwarder and the information as being routing information.

The method may use an active list of the clients to track the status of the clients. The list may identify clients that are deemed to be able to generate valid negative acknowledgements. Any negative acknowledgement sent by an active client may be sent retransmissions.

The method may use a deactivated list of the clients to further track the status of clients. The deactivated list may identify clients that are deemed not to be able to generate valid negative acknowledgements. Any negative acknowledgement sent by a deactivated client may be ignored, with no retransmissions sent thereto.

The method may move a client in the activated list to the deactivated list if a NACK threshold is exceeded for that client.

The method may move a client in the deactivated list to the active list after an activation condition is met. The activation condition may be the passage of a set length of time.

The method may further track a deactivation history of each client indicating instances of that client of being placed in the deactivation list. The deactivation history of each client may be utilized to determine the NACK threshold of that client.

The method may perform a full download of the information to all clients upon detection of a new client.

In the method, wherein the multicast packets may be Ethernet packets and the step (a) of transmitting comprises marking a header field in each multicast packet to indicate that a custom protocol for multicasting is being used.

The method may be able to detect the addition of a new line card into the system. Once the new line card is detected, then information is provided to the new client utilizing sequenced multicast packets.

For the method, when a new line card is detected, the information is provided to the new client and all line cards by retransmitting the information to all recognized line cards.

For the method, the line cards may be grouped into groups, with each group being associated with information embodied in a particular set of sequenced multicast packets.

Further, the method provides a custom multicast protocol negative acknowledgement (NACK) message that originates from forwarders which receive but cannot act on a multicast message requiring action. For example, a NACK message could be created where a message out-of-sequence condition occurs, due to a missing packet or packets. The forwarders ignore packets starting with a sequence number earlier than the next expected sequence number. A NACK packet is produced by a forwarder that receives a packet number numbered to indicate a gap or missing packets. Other NACK packet examples include, a forwarder out of buffer space or receiving packets too quickly.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1:
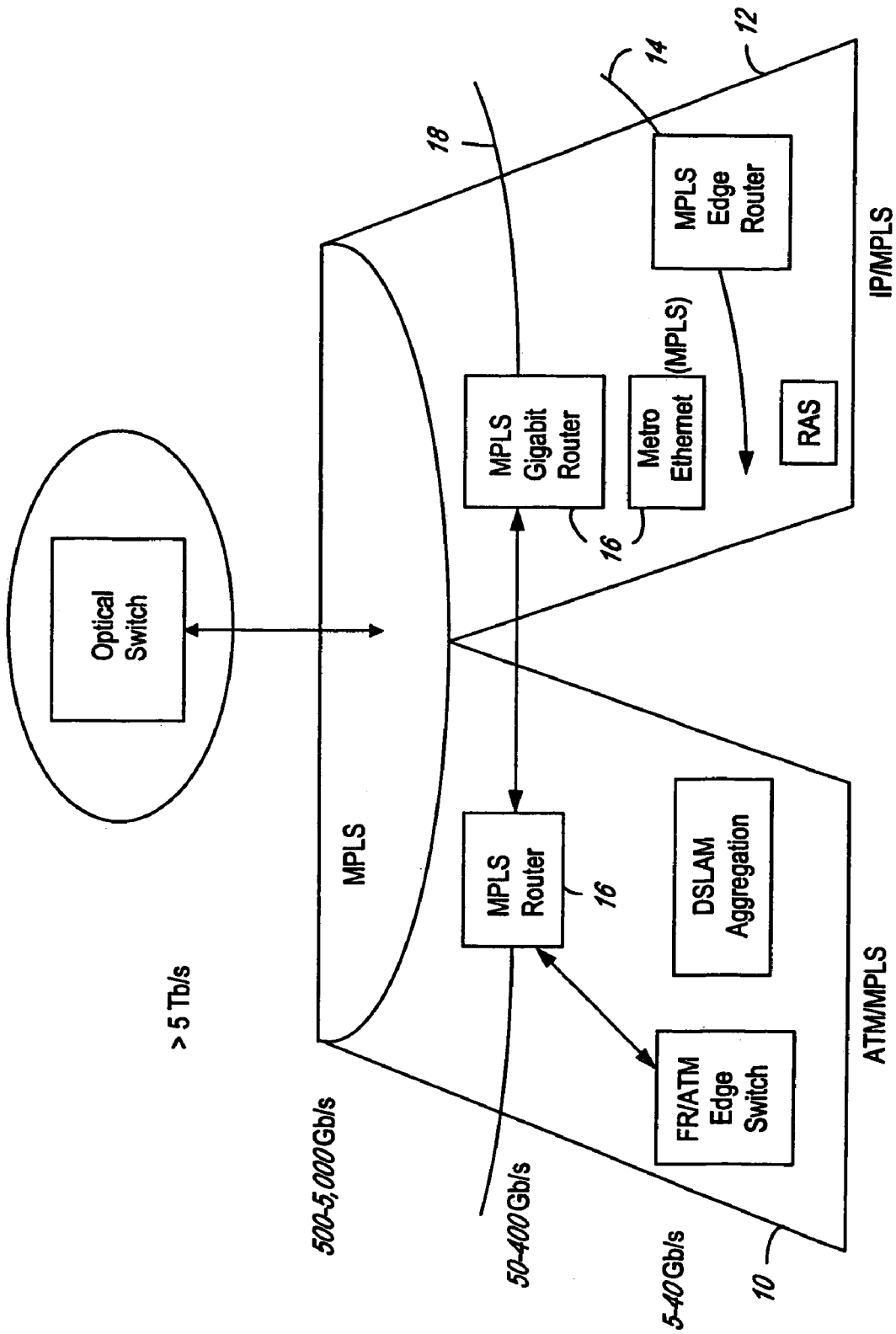
FIG. 1 is a chart of switch type and bandwidth.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

FIG. 1 shows a protocol bandwidth chart exemplifying the universe of bandwidth and transport protocol gamut available to network providers. An asynchronous transfer mode (ATM) leg 10 includes a multiprotocol label switching (MPLS) protocol capability for connection based communications. An internet protocol (IP) leg 12 includes MPLS and provides connectionless or packet based communications. The access points to a network or edge switching occur in the lower bandwidths at typical speeds of 5 to 40 gigabits per second, the upper bandwidth limit indicated by bandwidth topography line 14. Higher bandwidth requirements can be met by switches or routers that are capable of operating at higher speeds such as the 5 to 400 gigabits per second switches or routers 16 shown in the central portion of the chart proximal to bandwidth topography line 18. Increasing bandwidth is anticipated as technologies evolve to permit even higher speeds of data communications including a 500 to 5,000 gigabit per second bandwidth and beyond.

Figure 2:
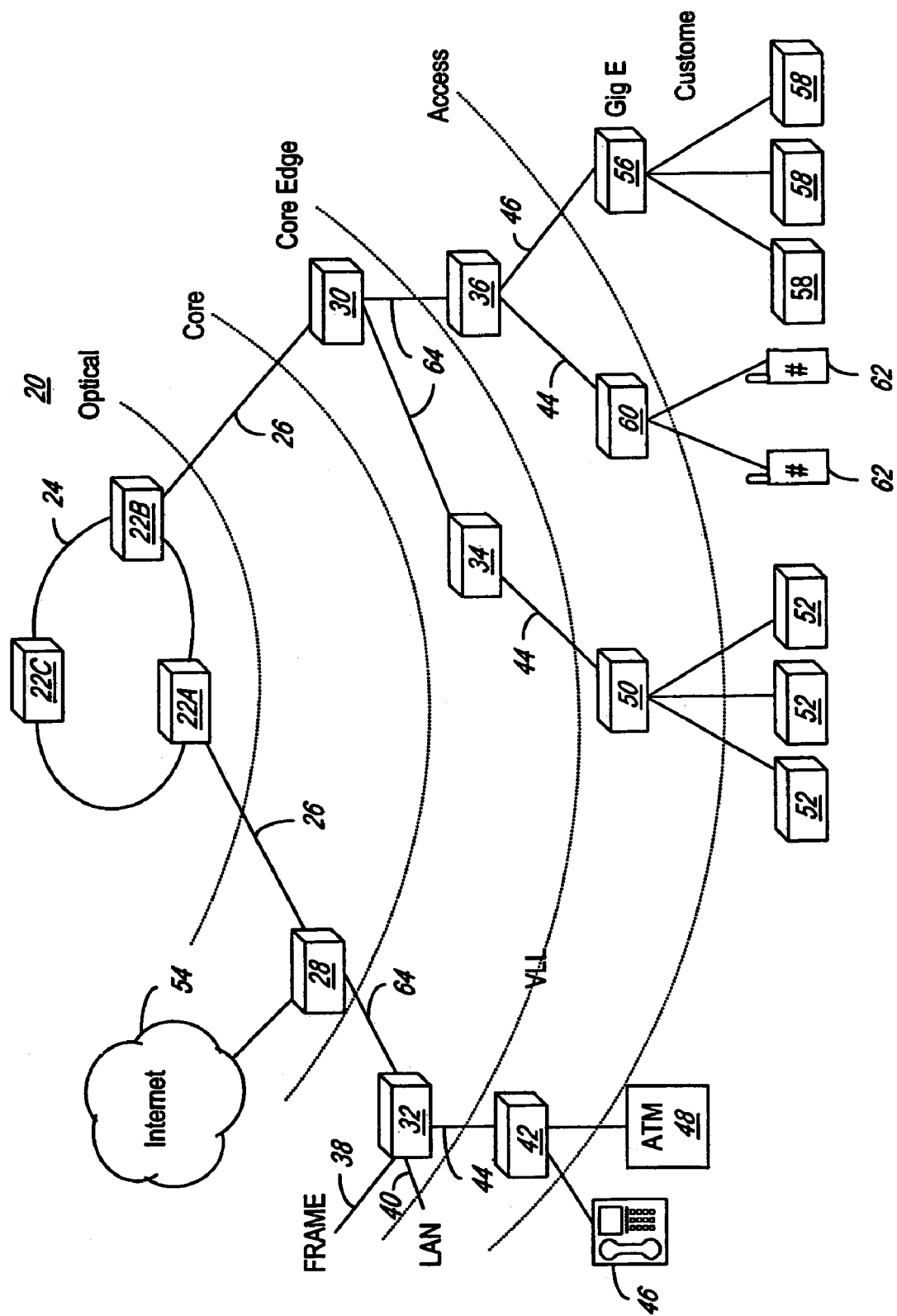
FIG. 2 is a diagram of a network of switches interconnected by communication channels exemplifying communications diversity.

Within these homogeneous network nodes a number of services and protocols can be implemented and supported by communications over a single physical link communications channel. FIG. 2 shows a typical network node arrangement depicting a variety of interconnected and inter-operating network communications services. An inner ring portion 20 of the network provides high speed communications over an optical ring 24. Optical switches 22 communicate over fibre optic loop 24. Traffic is provided with a point of egress and ingress into optical loop 24 over communications links 26 which are routed to switches 220, 226 and 22c as required. Thus, traffic from switch 28 to switch 30 of the core network is delivered by passing through the optical loop hub 24 via switches 22a, 22b, to complete the exchange of communications therebetween. Access to the core switching is provided by a number of edge switches 32, 34 and 36 which communicate with each other via the central optical core using the aggregation switches 28 and 30 as intermediaries. The core 22, 28 and edge switches 30 support the protocols or the installed communication technologies. For example, switch 32 is connected to a frame relay network at 38 and connects to a local area network via link 40. Plain old telephone service (POTS) and access to the public switch telephone network (PSTN) IS provided via an access switch 42. Access switch 42 communicates with core edge switch 32 over communications link 44. It is access switch 42 which provides PSTN subscribers 46 and other telephone services as for example, automated teller machine services (ATM) at 48. Other customer access is accomplished by means of a small office home office (SOHO) switch 50 to support a number of small office networks 52 and provide inter-communication therebetween. In the network topology depicted SOHO local networks 52 communicate with the Internet 54 via switches 50, 34, 30, 22b, 22a, and 28, using Internet Protocol, or IP protocol. Higher speed gigabit Ethernet access is provided by a metro gigabit Ethernet switch 56 to support corporate networks at various customer sites 58. Other forms of telephone service such as, for example, wireless telephone service and other third generation mobile services is provided by switch 60 which inter-operates with various wireless base stations supporting wireless communications to handsets 62. Naturally, PSTN subscribers 46 supported by access switch 42 can communicate with wireless subscribers served by access switch 60 by calling the customer wireless handsets 62 to establish communications therebetween. The communications over communications channels or paths 44, 64, 26 and 24 provide physical communications links which can be electrical or optical and which must support a wide variety of inter-operating and inter-communicating voice and data networks. Consequently, provisioning of the network equipment must include the ability to support existing networks while providing the capability to support new services and protocols and increasing traffic loads.

Figure 3:
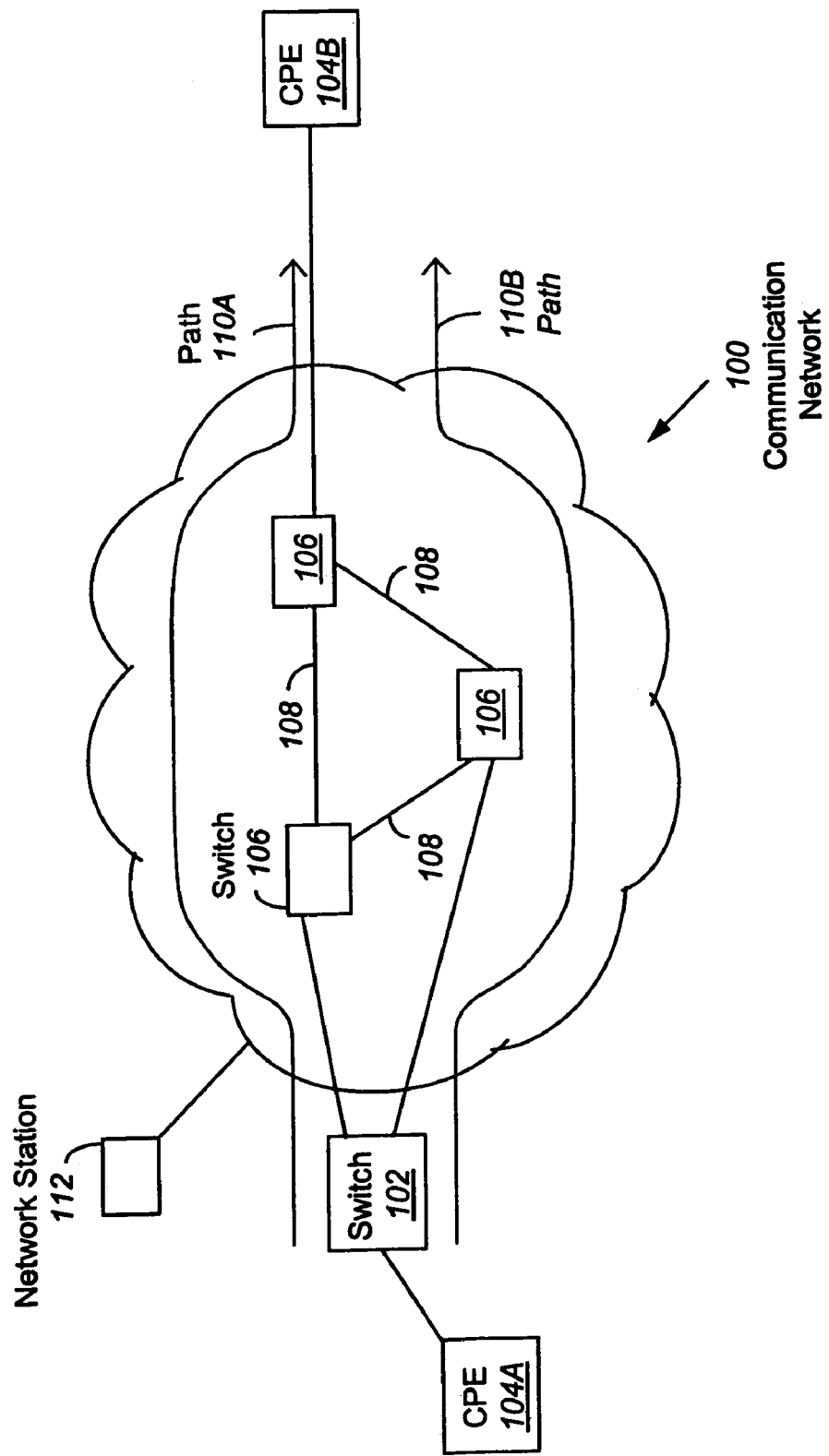
FIG. 3 is a block diagram of elements of a communication network including a communication switch embodying the invention.

Referring to FIG. 3 communication network 100 is shown. Switch 102 is connected to communication network 100, allowing a customer premise equipment (CPE) device 104, e.g. CPE 104A, at one location in network 100 to communicate to device at another location in network 100, for example, CPE 104B. Within network 100, other communication switches 106 are provided. Communication switches 106 are interconnected via links 108. Accordingly, each switch 104 can route traffic along a certain path 110 to other switches 104 or to other components associated with network 100. For example, data traffic from CPE 104A, which is destined for CPE 104B, may be routed through path 110A or 110B. Path information and information regarding particular switches 106 may be centrally configured and maintained by network station 112 which receives routing and status information from the elements in network 100. Switches 102 and 106 have routing information in the form of local routing tables stored in their elements which are accessed by the elements thereby enabling the switches properly to route the data traffic.

The routing information contents depend on the transmission protocol of the data traffic. For example, routing information for ATM traffic processed by switch 102 differs from routing information for IP traffic. As is known, IP traffic is a connection-less protocol, which requires switch 102 to have knowledge of routing paths to its immediate neighbours.

It will be appreciated that terms such as "routing switch", "communication switch", "communication device", "switch", "network element" and other terms known in the art may be used to describe switch 102 and 104. Further, while the embodiment is described for switches 102 and 106, it will be appreciated that the system and method described herein may be adapted to other communication systems.

Figure 4:
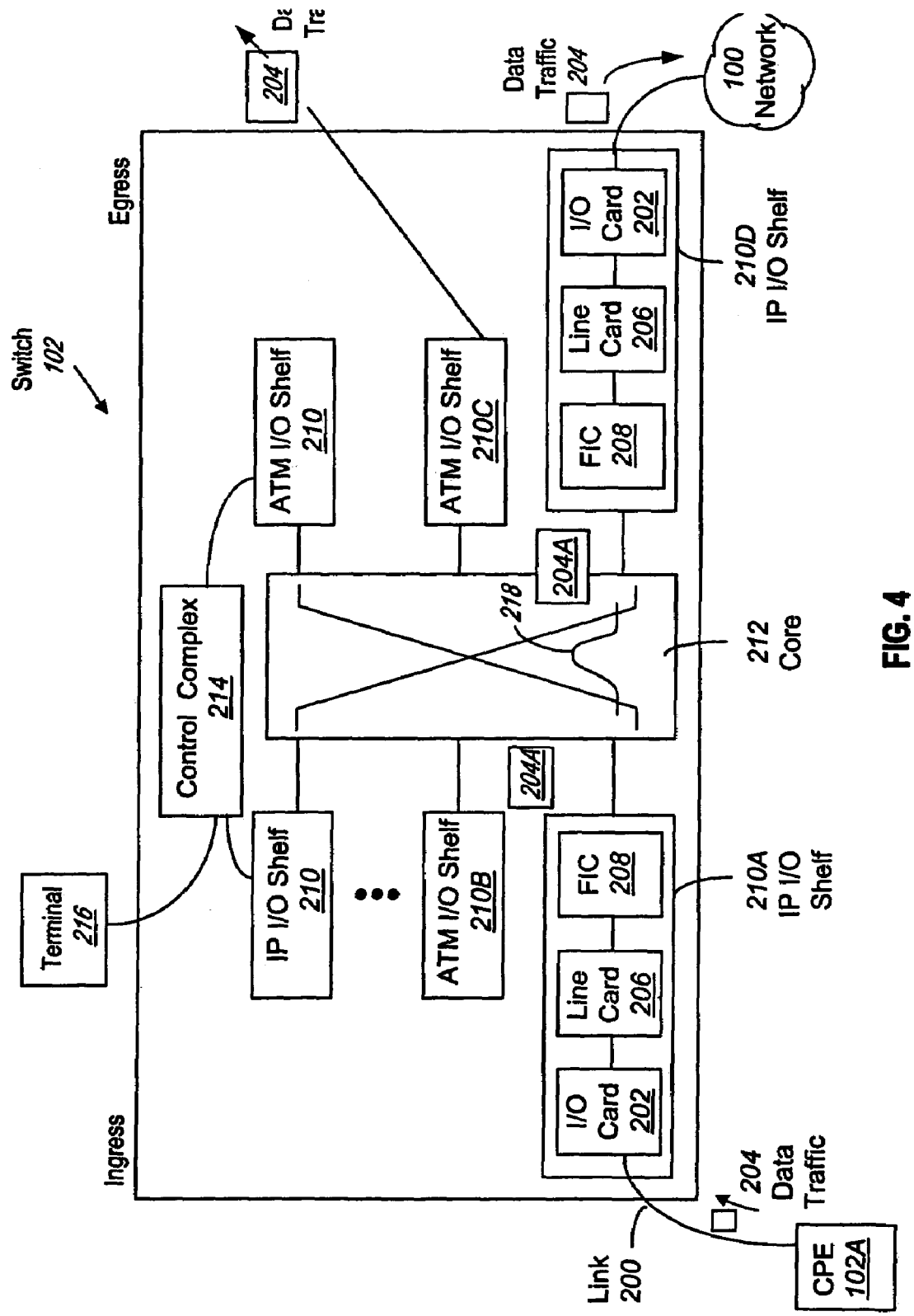
FIG. 4 is a block diagram of components, including line cards, a switching core, a central control complex and a terminal, of the communication switch of FIG. 1.

Referring to FIG. 4, in switch 102, CPE 102A is connected via a link 200 to switch 102. Switch 102 has an I/O card 202 to provide an interface for CPE 102A to switch 102 for its data traffic 204. Data traffic 204 may comprise cells, packets, frames or other segments of data. I/O card 202 acts as an interface for the data traffic from the ingress point to line card controller 206. Accordingly, I/O card 202 simply transmits the data traffic 204 to line card controller 206. Line card controller 206 provides OC-192 functionality, ATM provisioning and ATM cell processing of its received data traffic. Each line card controller 206 is also connected to a fabric interface card (FIC) 208 which converts the data traffic 204 to a switching core data message 204A and transmits the converted data traffic 204A to switching core 212.

In the embodiment, I/O card 202, line card controller 206 and FIC card 208 are located in each of a plurality of I/O shelves 210 adapted to receive such cards. Particular I/O shelves 210A, 210B are populated with the cards as needed to meet the configuration scale of the switch. Switch 102 is capable of handling different data traffic formats including IP and ATM using these data transfer cards 202, 206 and 208 of I/O shelf 210. Accordingly, IP traffic that is received at switch 102 at a particular I/O shelf 210A, which contains an I/O line card 202A configured for such traffic. ATM traffic is received at I/O shelf 210B, which contains a corresponding I/O line card configured for such traffic and line card controller 206B. By way of further example, switch 102 is shown with other I/O shelves 210D and 210E and ATM I/O shelves 210C and 210E. After receiving data traffic in an I/O shelf 210, switch 102 converts the data traffic 204 into switching core data messages 204A for internal processing. At the destination, the data traffic 204A is converted back to its native format (e.g. IP, ATM, POS) upon egress passage through I/O shelf 210D, of the data transfer cards of an egress, for example, the switch 102.

Within core 212, the converted data traffic 204A is routed along switching path 218, determined by the destination information associated with the data traffic 204. On exit from the core 212, the converted data traffic switching core data message 204A is provided to an egress I/O shelf 210D, which is associated by the switch routing controlled by control complex 214 to arrive at the proper egress path I/O shaft 210D for the data traffic destination. The data traffic flow of each I/O shelf is bi-directional. Thus, each I/O shelf is capable of acting as an ingress point and an egress point to each associated CPE 102 or to the network 100. As with the ingress I/O shelf 210, the egress I/O shelf 210 have a FIC card 208, a line card controller 206 and an I/O card 202. It will be appreciated that egress I/O shelf 210 and ingress I/O shelf 210 are interchangeable, depending on the direction of the data traffic 204. Again, data traffic 204 may leave switch 102 in various data formats. IP-formatted traffic may leave for a predetermined IP destination on egress IP I/O shelf 210D. Similarly, ATM traffic may leave switch 102 on egress ATM I/O shelf 210C. It will be appreciated that the general routing of data traffic within switch 102 may utilize other transmission systems or communications protocols known in the art.

In order to control operating aspects of switch 102, a control complex 214 is provided. Control complex 214 communicates with line cards 104 and 106 and core 212, via an internal control communication system 300, described in more detail below. Further, a terminal 216 is connected to control complex 214 of switch 102 and allow an operator to configure, modify, monitor, interact with and control the operation of switch 102.

Figure 5:
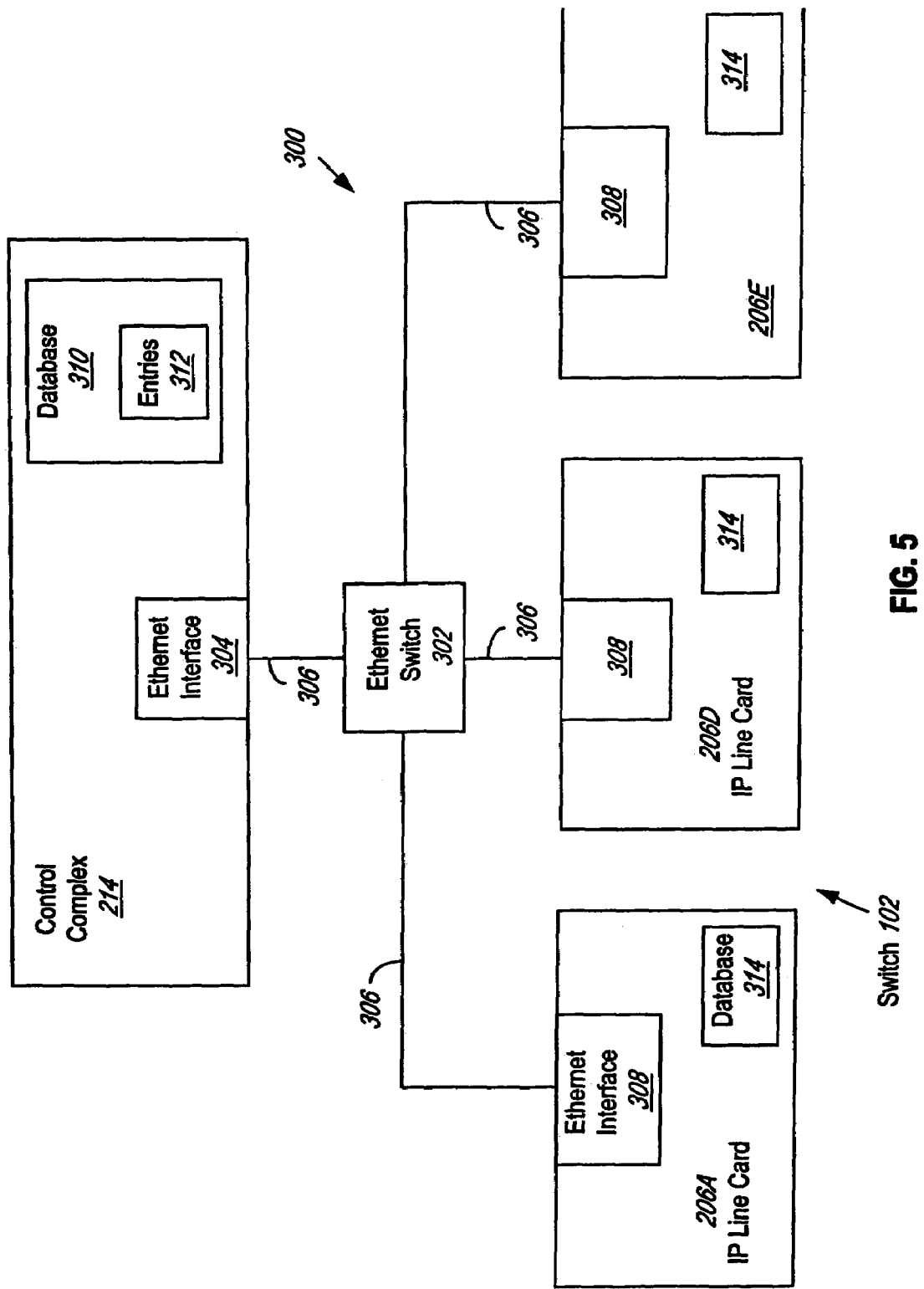
FIG. 5 is a block diagram of control communication system connecting line cards to the central control complex in the communication switch of FIG. 2.

Referring to FIG. 5, aspects of the control communication system 300 for control complex 214 are shown. Control communication system 300 allows control complex 214 to communicate control commands and download files, including files relating to data message routing information, to control the data card modules 202, 206 and 208 and core 212. Control complex 214 may also provide time stamping of data and synchronization of clocks for its connected elements. In the preferred embodiment, communications are provided between control complex 214, the line cards of I/O shelves 210 via an Ethernet network switch 302. Control complex 214 has Ethernet interface module 304 providing translation of the download files to packets for transmission on communication system 300. Connection 306 links control complex 214 to Ethernet switch 302; multiple connections 308 link Ethernet switch 302 to line cards 206 and core 212. As in the known Ethernet protocol, links 306 and 308 may be embodied in various forms such as back plane traces, thin coaxial cable or in a shield twisted pair and all elements in control communication system 300 may transmit and receive data packets independently.

Each line card controller 206 has an Ethernet interface module 308 allowing it to process and translate data packets sent and received on system 300. Each line card controller 206 has an internal Ethernet address or Medium Access Control (MAC) address allowing Ethernet switch 302 to uniquely identify each component with which it communicates as is customary in Ethernet networks and as set out in IEEE 802.3. While the embodiment utilizes an Ethernet switch 300 to distribute its configuration information, it will be appreciated that other local communication networks, such as a cell based fabric, may be used in switch in control communication system 300.

Upon receipt of a data packet, an element in system 300 will examine the data packet to determine whether it is the intended destination of the data packet. If it is not, the packet is discarded.

As noted above, control complex 214 contains and receives master routing information for data traffic which is processed by its line cards 206. Again, the routing information must be provided to the line cards 206. It will be appreciated that, for IP data traffic in particular, routing information must be provided to the line cards 206 (ingress and egress) to enable the line cards 206 to route the processed IP data traffic correctly to the next available "hop" associated with switch 102. As communication network 100 adds and loses nodes and links which affect the routing of data traffic through switch 102, the routing information must be updated for each line card controller 206.

In the embodiment, the IP routing information is stored in a database 310 of control complex 214. The routing information is stored as a collection of entries 312 in database 308. For IP routing information, each entry 312 is uniquely identified by its destination IP address and a prefix length. An entry 312 contains information required by a line card controller 206 to determine where to forward an incoming IP data packet of the data traffic. For example, in Table A, a table of the entries comprising the routing information for IP protocol packets is shown:

TABLE A

| External Destination IP address | Egress Line Card Controller in Switch 102 | Ingress Point in Switch 102 |
| --- | --- | --- |
| 1.2.3.4/32 | 206A | Line card controller 206C |
| 2.1.1.0/24 | 206C | Line card controller 206A |
| 3.1.1.1/32 | Router | Control complex 214 |

In the embodiment, the routing information of the entries 312 is stored in database 310 in a Patricia Trie data structure, which is indexed by IP address and prefix length. Updates to the routing information are provided to control complex 214 either manually or via packets received from other switches 102 (not shown) and processed through a routing protocol such as OSPF, BGP, ISIS, etc. The routing information, once provided to each line card controller 206, is stored locally in database 314. It will be appreciated that other data structures may be used in other embodiments.

Figure 6:
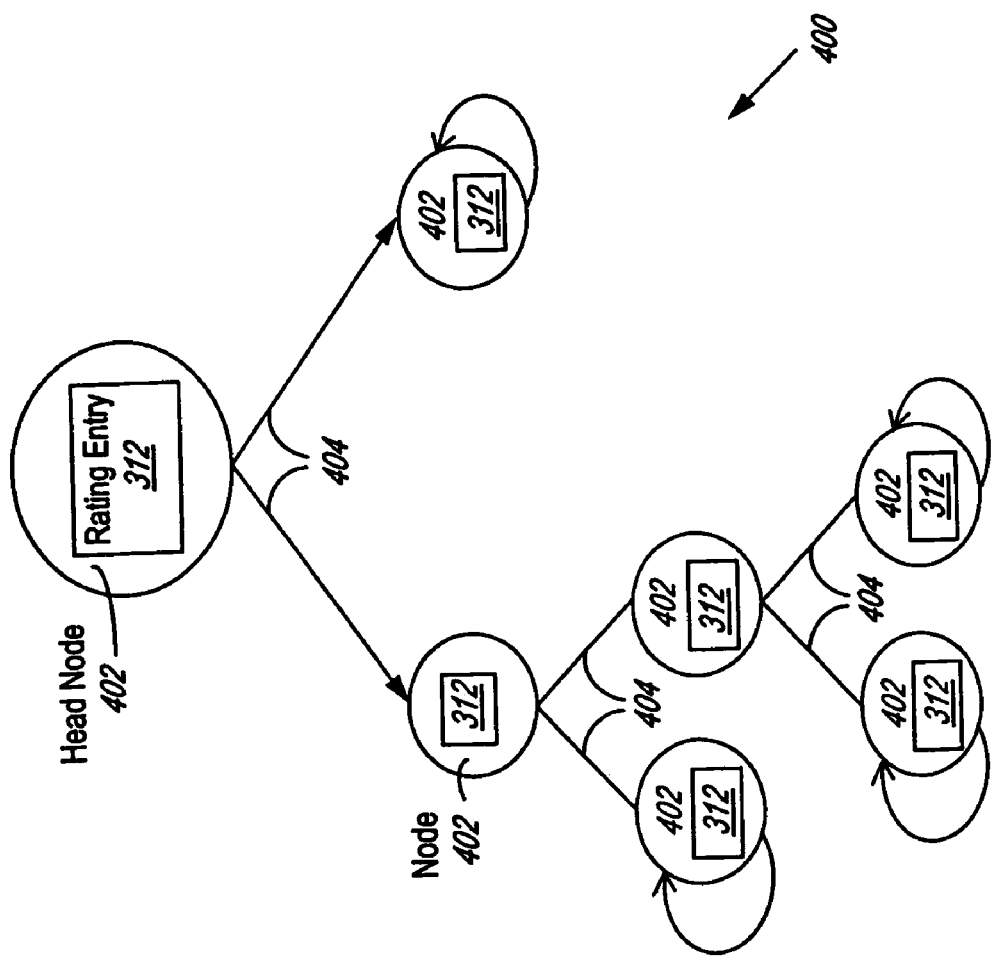
FIG. 6 is a block diagram of a Patricia Trie data structure associated with routing information stored by the central control complex of FIG. 3.

The routing information is provided to each line card controller 206 from control complex 314 via Ethernet switch 302. As such, the routing information of the entries 312 is segmented into a plurality of packets and are provided to each line card controller 206 when appropriate. Referring to FIG. 6, exemplary Patricia Trie data structure 400 is shown. All routing entries 312 are stored in Patricia Trie 400. Patricia Trie 400 comprises a head node 402 and a series of subordinate nodes 402 linked in a hierarchical manner to other nodes (including itself) via links 404. Each node 402 contains a record of a routing entry 312 of the entire routing information used by the switch. Accordingly, each node contains a particular entry for an IP destination address and a prefix link.

Control complex 214 can traverse Patricia Trie 400 to find any given routing entry information for any given IP address. If a complete rebuild of the routing information is required, then the server will traverse the entire Trie 400, visiting each node 402 and extracting routing information from each node. As routing information is extracted, control complex 214 builds packets containing the routing information. The packets are sent to the affected line cards 206. If only specific routes are updated, control complex 214 traverses Trie 400 to modify the nodes containing the updated routing information and builds a packet (or packets), if necessary, containing that information for transmission to the affected line cards 206.

Figure 7:
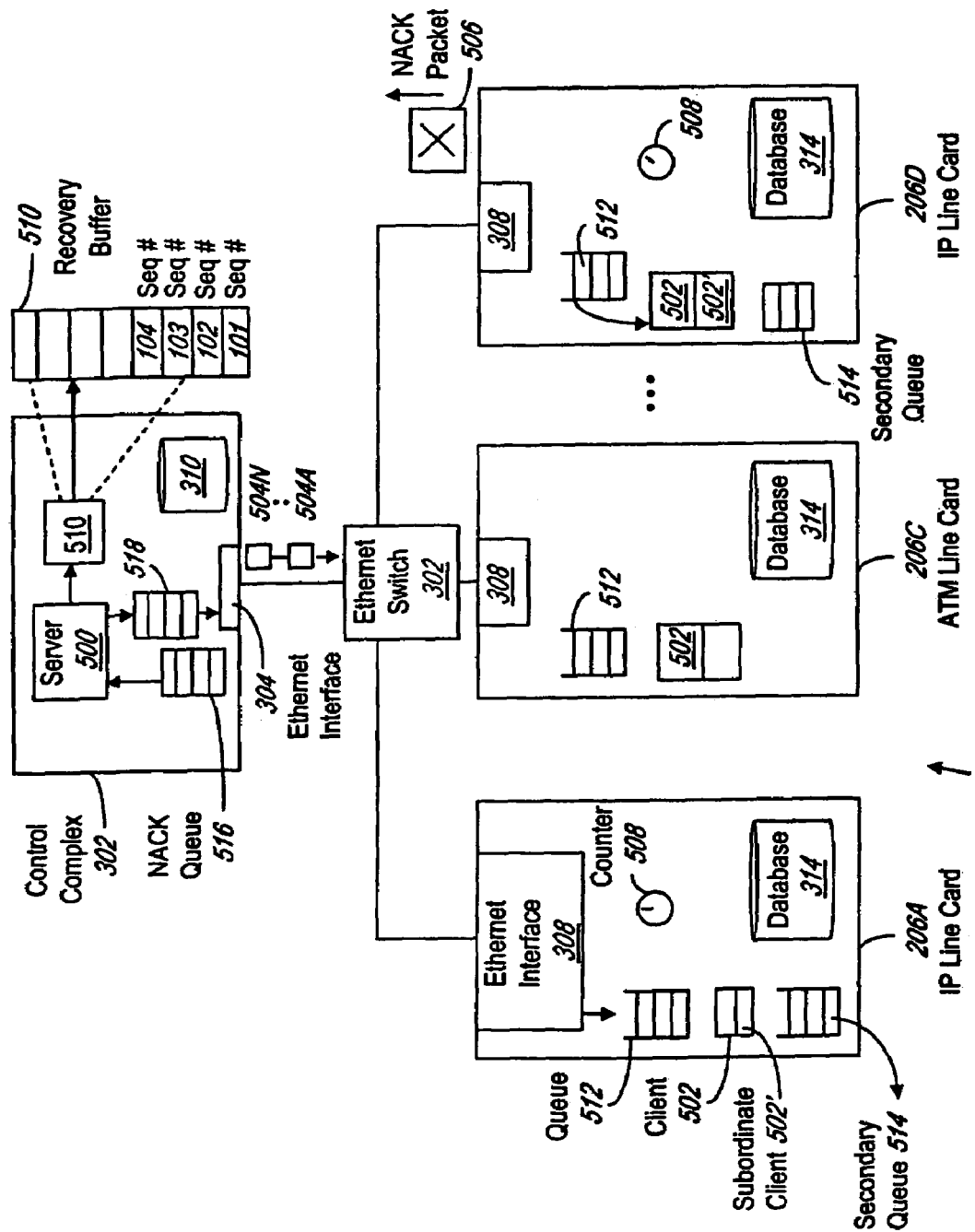
FIG. 7 is a another block diagram of the control communication system illustrating transmission of packets in the communication switch of FIG. 3.

Referring to FIG. 7, control communication system 300 is a client-server arrangement with the server 500 being the control complex 214 and clients 502 being each line card controller 206. For downloads from the server 500 to the clients 502, control complex 214 has routing information stored in entries 312 in database 310. Upon an update of the routing information, control complex 214 produces a series of packets 504A, 504B, . . . 504N which collectively comprise the full routing information of the entries 312 to Ethernet switch 302. Packets are built by control complex 214, enqueued in outbound queue 518 and provided to Ethernet interface 304 for transmission to Ethernet switch 302.

Figure 8:
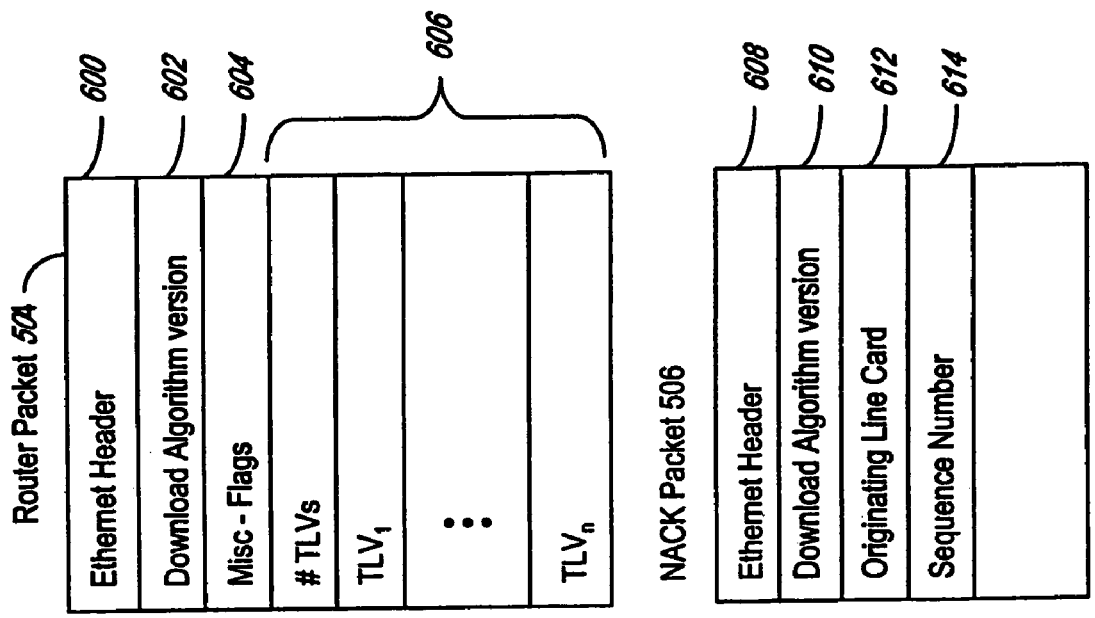
FIG. 8 is a block diagram of data packet sent by the control complex and a NACK packet sent by a line card in the control communication system of FIG. 3.

Referring to FIG. 8, details on the contents of packet 504 are shown. Packet 504 has header field 600, which is used by Ethernet switch 302 for switching purposes in network 300. Download algorithm field 602 allows the receiving client 502 to obtain algorithm version information about server 500, if needed, to check compatibility between server 500 and client 502. Miscellaneous status fields 604 transmit status information about the type of instruction carried in packet 502 and server 500 to clients 502 The data portion of packet 504 is contained in the set of sequentially numbered TLV (Type/Length/Variable) fields 606, which is a format known in the art. Each TLV field 606 is a self-contained field containing routing and updating information for an entry 302 for a node 402 in Trie 400. The Type subfield indicates the type of command associated with the routing information. In the embodiment, the Type field is one of: Build, Route, Flush and CRC check. A Flush command is interpreted by the client 502 that its current routing table is to be discarded and that further routing information will be provided in further TLV fields 606, which are to be used to build the new routing table. A Route command indicates that the TLV field 606 contains one piece of routing information for one IP address. A Build command indicates that the server 500 should build a new route table using previously received Route command entries.

A CRC check command instructs the client 502 to perform a CRC check on its local route database. The CRC value can be checked against the CRC value of the Trie in the server 500.

When a complete rebuild is required by server 500, the server 500 builds a packet 504 in which its first TLV field 606 contains a Flush command. As described earlier, server 500 traverses the entire Trie 400 and inserts individual Route commands containing commands to add the new route within a packet. If the packet is full, a new packet is generated for new Route commands. After all nodes have been inserted into the packet(s), the server inserts a build command into the packet.

When an update is required, server 500 builds a packet 504 which contains a Route command in a TLV field 606. The Route command will tell client 502 to add/delete the node identified in the value field.

The Length field in TLV field 606 indicates a length which may be associated with the Type subfield. For example, for a Route command, the Length field indicates the length of the Value field for the command.

The Value field in the TLV field represents the specific contents of the command; it may also indicate to add or delete the associated route of the TLV field. For a Route command, the Value field also contains the specific IP address information which is needed to complete the route information for that entry 312.

In the embodiment, routing information packets 504 are addressed to an Ethernet multicast address. Each line card controller in set 206 receives all routing information packets because Ethernet switch 302, in conformance with the Ethernet standard, floods each received multicast packet out all of its interfaces, except the interface it was received on. Accordingly, IP line cards 206A and 206D which are configured to "listen" for such multicast packets 504A . . . 504N originating from Ethernet switch 302 and ATM line card controller 206C is configured to ignore such multicasts. Accordingly, the Ethernet switch 302 provides a system of providing selective multicast downloads in a parallel manner to targeted line cards 206 based on the particular protocol that the routing relates to e.g. IP, ATM, MPLS etc. It will be appreciated that in other embodiments, a multicast flow may be provided for ATM line cards 206C which will be ignored by IP line cards 206A and 206D. As each packet 504 is multicast to each targeted line card controller 206A and 206D, it will be appreciated that the system is more efficient than individually sequentially providing each line card with each packet.

It is necessary to track the receipt of the packets 504 by the clients 502 in order to ensure that each client 502 receives the full download in proper order. Packet tracking between the server 500 and client 502 is provided as follows.

For each download from database 310, each packet within the download will have a sequential sequence number associated with it. Accordingly, for packets 504A . . . 504N there are 14 packets; each packet has a sequence number associated with it, namely "100" (for 504A), "101" (for 504B) . . . , "113" (for 504N). The sequence number is tracked by each line card controller 206 as it receives packets 504 from switch 302. Accordingly, when a line card controller 206 receives a first packet 504, it reads the sequence number of the packet ("100" for packet 504A) and stores the value locally in a tracking variable. Then, the line card uses counter 508 to increment the value. The incremented value (now "101") is the sequence number of the next expected packet 504 from switch 302. Upon receipt of the next packet 504, line card controller 206 examines the sequence number of that next packet ("101" for packet 504B) and if the sequence number matches the value of the tracking variable, then the next packet is the expected next packet. Accordingly, line card controller 206 accepts the next packet 504.

In a normal operation, each line card controller 206 receives each sequential packet 504 in good order and verifies the order using the tracking variable to tracks the sequence numbers of the received packets. Packets are processed on an event basis using a state machine (described later). Upon receipt of a new packet 504, the client 502 removes a packet 504 from queue 512, determines whether its sequence number is valid, and if so, places the packet 504 into secondary queue 514, if there is room. The secondary queue 514 is used as a holding area for routing information which is accessed by a subordinate client 502' of client 502. Subordinate client 502' is responsible for building its local routing information table for the client 502. Again, a table is built when a Build command is processed by a subordinate client 502' from the TLV field in a packet 504. When the Build command is extracted from a packet which has been transferred to secondary queue 514, subordinate client 502' builds a Patricia Trie which has a similar structure to the Patricia Trie 400 stored in database 510. The complete structure is stored in database 314.

However, if a line card controller 206 does not receive its next expected packet, the value of the tracking variable is used to detect the loss of the next expected packet. For example, if line card controller 206 successfully receives first packet 504A, tracking variable is initial set to "100", then is incremented to "101", indicating that it is expecting packet 504B. However, it will be assumed that packet 504B is not transmitted to line card controller 206, as it is lost or corrupted. Accordingly, switch 302 continues with its sequential multicast of packet 504 and provides packet 504C to line card controller 206. Upon receipt of packet 504C by line card controller 206, line card controller 206 examines the sequence number of packet 504C ("102") and compares it against the value of the tracking variable. As the value of the tracking variable ("101") does not match the value of the sequence number ("102") of the recently received packet (504C), line card controller 206 determines that it has not received its expected next packet (504B). As such, line card controller 206 notifies control complex 314 of the lost packet.

To notify the server 500 of the loss of the packet, line card controller 206 generates and transmits a NACK packet 506 to control complex 214 via Ethernet switch 300 using unicast Ethernet addressing. The NACK packet 506 contains the value of the expected sequence number of the expected packet 504 from the line card controller 206. Preferably, the NACK packet is generated and sent soon after detection of the loss of the packet. Upon receipt of the NACK packet 506, the control complex 214 stops transmission of subsequent packets 504 and attempts to resynchronize the transmission of the data packets. Referring to FIG. 8, NACK packet 506 includes a header field 608, a download algorithm version field 610, an originating line and field 612 (which identifies the client 504) and a sequence number field 614 which identifies the sequence number of the expected, but not received, next data packet 504 by the client 502.

To resynchronize transmissions efficiently, server 500 maintains a recovery buffer 510 which contains a record of the n last sent packets 504. The sequence number in the NACK packet 506 is extracted and server 500 determines whether the sequence number (and hence the associated packet) is contained in the recovery buffer 510. If there is a match, then the server 500 can begin transmitting sequential packets 504 beginning from the contained entry in the recover buffer 510 (here 510A). In the embodiment, the recovery buffer 510 is implemented as a circular list. The server 500 preferably re-multicasts to all targeted line cards 206, packets beginning from the packet 510A. In the event that there is no match in the recovery buffer 510 with the sequence number extracted from the NACK packet 506, server 500 begins the download of entity 312 from the beginning, i.e. in the example, beginning with packet 506A. It will be appreciated that if time to generate and transmit NACK packets is kept to being as small as possible, there is a higher possibility that the lost packet is still contained within the recovery buffer.

To resynchronize the counters 508 of the affected clients 502, server 500 transmits a special resynchronization packet 504 containing a new beginning sequence number for the redownloaded routing information. The clients 502 recognize the resynchronization information, halt transmission of NACK packets 506, and await receipt from server 500 of a next valid packet 504. The next valid packet 504, in this instance, would be the first packet of a restarted full download of the routing information.

During retransmission of packets 504, when a line card controller 206 receives a duplicate packet 504 (e.g. 504B), because it did not lose a packet, the line card controller 206 discards the extra packet and does not modify the tracking variable. Once a packet 504 is received with the expected sequence number for that line card controller 206, then that line card controller 206 accepts the packet and increments its tracking value, as before.

In the embodiment, once a NACK packet 506 is generated and sent by a line card controller 206, the line card controller 206 starts a timer and waits for the negatively acknowledged packet. If the negatively acknowledged packet has not arrived then the affected line controller 206 may transmit another NACK packet 506 to the server 500 upon the expiration of a timer value. The above process, of timer driven re-transmission of the NACK will continue until the requested packet arrives.

When a NACK packet 506 is received by the server 500 it is queued in NACK queue 516. Server 500 dequeues entries in the NACK queue 516 and processes them sequentially. During and for a period immediately after the retransmission phase, in order to allow the line cards to process their queued information, the server 500 may vary the rate of transmission of each subsequent packet in order to allow the queues in the line card to process their internal information.

If the last packet 502 which contains the Build command in its TLV field is lost, the client 502 will not have recognized the lost last packet because there is no subsequent packet which could be used to examine its sequence number against a missed sequence number. Accordingly, the embodiment transmits a special idle packet 504 periodically after a predetermined amount of time in which no packet was sent by server 500. The sequence number of the idle packet is the next sequence number following the sequence number of the last packet. Accordingly, if the last packet is lost, when the client 502 receives the idle packet, it will recognize that the sequence number is out of synchronization and it will generate an appropriate NACK packet 506 to have the server 500 retransmit the last packet, in a manner as described above. It will be appreciated that the predetermined amount of time may change during the operation of server 500.

Similarly, an idle packet 504 is sent by server 500 after the transmission of a resynchronization packet, to have a check mechanism for a lost resynchronization packet.

It is possible that a client 502 may transition into a state where it transmits a sequence of NACKS that severely retards, or completely stops, the flow of information from server 500 to all clients 502. To prevent its transmission from being blocked, server 500 preferably monitors the state of operation of each client 502. In the embodiment, server 500 keeps a list of active clients 502 from which the server 500 will respond to sent NACKs and a list of deactivated clients 502 from which the server 500 will not respond to sent NACKs. Each time a NACK packet is received from a transmitting client 502, server 500 examines its active and deactivated lists to determine whether or not to respond to the NACK. If the transmitting client 502 is in the active list, then server 502 may respond to the NACK by retransmitting, if possible, the lost packet associated with the NACK. During retransmission, all of the active and deactivated clients 502 receive the retransmitted packets. In other embodiments, deactivated clients may not be sent the retransmitted packets.

In the embodiment, server 500 uses the active client list and deactivated list as follows. For each client 502, a NACK history is maintained which tracks the time and frequency particulars of NACK packets generated by each client 502. For a NACK-transmitting client 502 in the active list, when the NACK is received by server 500, the NACK history is of the NACK-transmitting client is updated and is compared against a threshold. If the threshold for the NACK-transmitting client 502 is exceeded, then the NACK-transmitting client 502 is removed from the active client list and placed in the de-activated list and no further action is taken in response to the NACK. If the threshold is not exceeded, then server 502 attempts to retransmit the packet associated with the NACK. Different clients 502 may have different thresholds. For deactivated clients in the deactivated list, if a server 500 receives a NACK from a deactivated client, the NACK is ignored and no retransmission is sent for it.

It is preferable to have a mechanism to promote entries in the deactivated list to the active list. In the embodiment, a client 502 on the deactivated list remains there for a set period of time regardless of other factors. The period of time may be in the order of minutes. Alternatively, a client 502 may remain on the deactivated list until a certain period of time has passed since the last transmission of a NACK therefrom. Alternatively still, a deactivated client may be promoted to the active list after other conditions are met. One example is to promote a deactivated client if it is has the fewest NACKs associated with all of the clients in the deactivated list.

After a client 502 is moved from the deactivated list to the active list, the following procedure is followed. First, resynchronization of the sequence number is performed, followed by a full download of the database 310 to all clients 502, both active and deactivated. During re-admission attempts, the thresholds for deactivated clients 502 are preferably lowered to be more stringent than thresholds for active clients 502. Re-admission of a client 502 may be attempted a limited number of times. After all such attempts fail, the client 502 may be permanently de-activated.

As a further feature, server 500 maintains a de-activation history for each client 502. As the de-activation history grows for a client 502, the threshold used to determine when to move that client 502 from the active list to the deactivated list may be lowered.

Referring to FIG. 7, it will be appreciated that in switch 102, different line cards 206 may have different software download requirements. Accordingly, a further embodiment provides the ability to define groups of line cards 206. Each group is associated with a specific download and each line card in each group is to receive the same download. Control of membership into a group is performed by software, preferably operating on control complex 214. The software is able to establish groups of multicasts for different software downloads for the line cards 206. Membership lists of the groups may be maintained by the software to facilitate management of the groups.

In managing the groups of clients 502, server 500 may be configured and programmed to handle distribution of downloads for each group. Alternatively, separate logical or physical servers 500 may be established to handle individual distribution of downloads.

As a further feature, the embodiment provides automatic recognition of new line cards as clients. Referring to FIG. 7, during operation of switch 102 one or more line cards 206 may be added to an I/O shelf as a new client. Insertion of a line card 206 is detected by software operating on control complex 214 using techniques known in the art. For example, the new line card may be IP line card 206D and may signal control complex 214 by generating and sending a special "new card" packet via its Ethernet interface 308. Upon detection, and if the new line card 206 is an IP line card, control complex 214 informs server 500 of the existence of the new client 502. Server 500 or control complex 214 may also determine a download group to which the new client belongs and makes appropriate amendments to the membership group lists. In order to synchronize databases between the server 500 and client 502, server 500 preferably executes a full download of its database 310. The above mechanism extends to accommodate scenarios that include the insertion of line cards 206 which contain one or more independent clients 502, and control complexes 214 which contain one or more independent servers 500.

To summarize operation of server 500, Table B provides a chart of a state machine used by server 500 to provide its functionalities. The state machine has four states: uninitiated, active and recovery and sequence number resync. Transitions between states are made upon the arrival of a NACK packet, a signal from the NACK timer, a signal from the Idle Timer or an indication that a packet is in the input queue.

TABLE B

| | States | | | |
|---|---|---|---|---|
| | Uninitialized | | Recovery | Sequence Number Resync (SNR) |
| Entrance | Set CSN to NULL (0) | Transmit MFD ServerOpen Event to Application. Start the Idle timer | Transmit MFDServerClose event to application. Enable the NACK timer. | Transmit SNR Pkt to Line Cards using CSN, transmit MFD Server Reset Request and MFDServerClose Event to the Application. Start Seq Number Reset Timer. Transmit Idle Pkt. Flush Recovery buffer and Input Queue. |
| Exit | Nothing | Disable Idle Timer | Disable the NACK timer | Disable SNR Timer |

| | Actions States | | | |
|---|---|---|---|---|
| Inputs | Unitialized | Active | Recovery | Sequence Number Resync (SNR) |
| NACK from client | Discard | Do pre-processing on Nack queue. If nack.seqNum < csn then if seqnum of nack is in the recovery buffer then set Insn = nacked seqNum. Transition to recovery else change state to Sequence Number Reset end if | Do pre-processing on Nack queue. If nack.seqNum < csn then if nack.seqNum <Insn then if seqnum of nack is in the buffer then set Insn = nack.seqNum else change state to Sequence Number Reset end if | Increment numNacksRxinSNRPeriod counter |
| NACK Timer | Software alarm: Swalarm | Swalarm | Insn = retransmiburst ( ) it Insn == csn then change state to active else restart nack timer end if | Swalarm |
| Idle Timer | Swalarm | If ITSN = CSN then transmit Idle Pkt else reset Idle timer and set ITSN to CSN. | Swalarm | Swalarm |

TABLE B-continued

| Pkt in input queue | Do Nothing | Transmit Pkt. Increment CSN. Add to recovery buffer | Do Nothing | Do Nothing |
| --- | --- | --- | --- | --- |
| Initialize the Server State Machine | Set CSN = 1, transition to sequence number reset state | Swalarm | Swalarm | Swalarm |
| Overload event from application | Swalarm | Transition to SNR state | Transition to SNR state | Swalarm |
| SNR Timer | Swalarm | Swalarm | Swalarm | in SNRPeriod is less than max SNR periods then if Snr Timer Period <2 or num Nacks Rxed In SNRPeriod >O then transmit SNR and Idle packet and Start the SNR Timer else change state to Active end else change state to Active. End snrTimerPeriod++ |

Referring to Table C, a chart of the state machine of a client 502 is provided. The state machine has three states: Uninitiated, Active and Recovery. Transitions between states are made upon signals from queue 512 indicating whether it is full, and a comparison of the current sequence number (CSN) tracked by counter 508 against the sequence number extracted from the last recovered packet. Timers for the NACK packet retransmission and the Sequence Number Not Incremented in a Long Time (SNNILT) are also inputs for the state machine. The SNNILT timer provides a timeout check for client 502 if it does not receive any packet 502 after a prolonged period of time.

TABLE C

| | States | | |
| --- | --- | --- | --- |
| | Uninitialized | Active | Recovery |
| Entrance | CSN = Current Sequence No. Set CSN to NULL | Start Sequence Number Not Incremented In a Long Time (SNNILT) timer and set SNNILT variable equal CSN | Transmit a NACK for CSN. Start NACK the timer. |
| Exit | Set CSN equal sequence number of packet +1 | Disable SNNILT timer | Disable the NACK timer |

| | Inputs | | | | | | | | | |
| --- | --- | --- | --- | --- | --- | --- | --- | --- | --- | --- |
| | Packet Characteristics | | | | | | | | | |
| | Sequence Number | | | Bits | | Timers | | | | |
| QSTATE | Seq # == | Seq # > | Seq # < | < Idle Seq | Reset Seq | NACK | SN NILT | Actions States | | |
| Full | CSN | CSN | CSN | # | # | K | LT | Uninitialized | Active | Recovery |
| X | | | X | | | | | Discard Pkt & Move to Active state | Discard Pkt and increment CSN | Discard Pkt, increment CSN, and transition to Active state |
| X | | X | | X | | | | Discard Pkt & Move to Active State | Set CSN equal to sequence number of packet +1 and Discard Pkt | Set CSN equal to sequence number of packet +1. Discard Pkt, transition to Active state |
| X | X | | | X | | | | Discard Pkt & Move to Active state | Set CSN equal to sequence number of packet +1 and Discard Pkt | Set CSN equal to sequence number of packet +1. Discard Pkt, transition to Active state |
| X | X | | | | X | | | Discard Pkt & Move to Active State | Discard Packet and Increment CSN. | Discard Pkt. Increment CSN, and transition to Active state |
| X | X | | | | | | | Discard Pkt | Discard Pkt transition to Recovery | Discard Pkt |
| | | X | | | | | | Enqueue packet and transition to Active state | Enqueue packet and increment CSN | Enqueue packet, increment CSN, and transition to Active State |
| | X | | X | | | | | Discard Pkt & Move to Active state | Discard Pkt and increment CSN | Discard Pkt, increment CSN, and transition to Active state |
| | X | | | X | | | | Discard Pkt & Move to Active state | Set CSN equal to sequence number of packet +1 and Discard Pkt | Set CSN equal to sequence number of packet+1. Discard PK transition to Active state |

TABLE C-continued

| | | | | | | | |
|---|---|---|---|---|---|---|---|
| X | | X | X | | Discard Pkt | Discard Pkt transition to Recovery state | Discard Pkt |
| | X | | | | Enqueue packet and transition to Active state | Discard Pkt transition to Recovery state | Discard Pkt. Increment counter. If counter is greater than limit transition to Uninitialized state |
| X | | X | | | Discard Pkt & Move to Active state | Discard Pkt transition to Recovery state | Discard Pkt. Increment counter. If counter is greater than limit transition to Uninitialized state |
| X | | | X | | Discard Pkt & Move to Active state | Set CSN equal to sequence number of packet +1 and Discard Pkt | Set CSN equal to sequence number of packet +1, Discard Pkt, transition to Active state |
| X | | X | X | | Discard Pkt | Discard Pkt transition to Recovery state | Discard Pkt |
| | X | | | | Enqueue packet and transition to Active state | Discard Pkt | Discard Pkt |
| | X | X | | | Discard Pkt & Move to Active state | Discard Pkt | Discard Pkt |
| | X | | X | | Discard Pkt & Move to Active state | Set CSN equal to sequence number of packet +1 and Discard Pkt | Set CSN equal to sequence number of packet +1 and Discard Pkt |
| | X | X | X | | Discard Pkt | Discard Pkt | Discard Pkt |
| | | | | X | r Alarm | Alarm | Transmit a NACK if nacked the same seqNum too many times change state to unintialized and if restart nack timer. If timer restart failed change state to uninitialized end if. |
| | | | | X | Alarm | if CSN == SNNILT transmit a NACK else set SNNILT to CSN | Alarm |

It is noted that those skilled in the art will appreciate that various modifications of detail may be made to the present embodiment, all of which would come within the scope of the invention. In particular, although the present embodiment is directed towards downloading of routing information in a series of sequential packets, the embodiment may be suitably modified to be used in any information distribution system which requires the multicast, or broadcast, transmission of sequential data units from a central source.

We claim:

1. A method of distributing information from a server to a plurality of clients, comprising the steps of:
   (a) transmitting the information in a plurality of multicast packets from the server to the plurality of clients, each of the packets having sequence information in relation to a sequential order of transmission of the plurality of packets from the server;
   (b) tracking for receipt of a negative acknowledgement message received from a sending client of the plurality of clients, the negative acknowledgement message including sequence information for one of the plurality of packets that was expected at the sending client in relation to the sequential order of transmission but was not received in the expected position in the sequential order; and
   (c) in response to receiving the negative acknowledgement message from the sending client, the server evaluating a status of the sending client and if the status indicates that the sending client is active, then re-transmitting to the plurality of clients a portion of the plurality of multicast packets starring from the packet having the sequence information identified by the negative acknowledgement message to the last of the plurality of multicast packets in the sequential order;

wherein each of the plurality of clients is a forwarder of a network element in a communication network, the server is a routing processor of the network element and the information is routing information;

wherein for the evaluating of the status of the sending client, an active list of members of the plurality of clients is maintained, the active list indicating which clients of the plurality of clients are deemed to be active and able to generate a valid negative acknowledgement message;

wherein for the evaluating of the status of the sending client, a deactivated list of members of the plurality of clients is maintained, the deactivated list indicating which clients of the plurality of clients are deemed to be unable to generate a valid negative acknowledgement message;

wherein a client in the active list is moved to the deactivated list if a negative acknowledgement threshold for that client is exceeded;

wherein a client in the deactivated list is moved to the active list after an activation condition is met;

wherein the activation condition is the passage of a period of time between events related to the client in the deactivated list; and.

wherein a deactivation history of each client of the plurality of clients is kept indicating instances of the each client being placed in the deactivated list.

2. The method of claim 1, wherein contents of the deactivation history of each client is utilized to determine its negative acknowledgement threshold.

3. The method of claim 2, wherein upon detection of a new client, a download of the information is provided to all clients from the server.

4. The method of claim 3, wherein the multicast packets are Ethernet packets and the step (a) of transmitting comprises marking a header field in each multicast packet to indicate that a custom protocol for multicasting is being used.

5. The method of claim 4, wherein the negative acknowledgement message is generated at the sending client by the sending client tracking receipt of each of the plurality of multicast packets, and if a sequence information of a received packet identifies the received packet as out-of-sequence in relation to the sequential order of transmission with respect to a last received packet, then generating the negative acknowledgement message and transmitting said negative acknowledgement message to the server, the negative acknowledgement message including the sequence information for one of the plurality of packets that was expected in relation to the sequential order of transmission with respect to the last received packet.

6. The method of claim 4, wherein the negative acknowledgement message is generated in response to one of the plurality of clients being out of buffer space for receiving the multicast packets.

7. The method of claim 6, further comprising the step of ignoring, by clients other than the particular client generating the negative acknowledgement message, re-transmitted multicast packets.

8. The method of claim 7, wherein the step (a) of transmitting is performed at a rate that is in accordance with a rate determining parameter.

9. The method of claim 8, further comprising setting the rate determining parameter in dependence upon receiving the negative acknowledgement message.

10. The method of claim 1, wherein upon addition of a new client into a group comprising the plurality of clients, the new client is detected and the information is provided to the new client utilizing the plurality of multicast packets provided in the sequential order.

11. The method of claim 10, wherein the information is provided to die new client and all other members of the group by retransmitting the information to all members of the group.

12. The method of claim 1, wherein the plurality of clients are categorized into groups of clients, and the information transmitted to each group of the group of clients is one of a plurality of sub-groups of the information.

* * * * *

UNITED STATES PATENT AND TRADEMARK OFFICE
CERTIFICATE OF CORRECTION

PATENT NO.        : 7,234,000 B2
APPLICATION NO.   : 10/302914
DATED             : June 19, 2007
INVENTOR(S)       : William Ross McEachern et al.

Page 1 of 1

It is certified that error appears in the above-identified patent and that said Letters Patent is hereby corrected as shown below:

1. Claim 1, column 17, line 64: Replace the word "starring" with the word --starting--.

2. Claim 1, column 18, line 35: Insert a comma after the word "element".

3. Claim 1, column 18, line 55: Replace the period after the word "and" with a comma.

4. Claim 11, column 20, line 15: Replace the word "die" with the word --the--.

Signed and Sealed this

Sixteenth Day of October, 2007

JON W. DUDAS
*Director of the United States Patent and Trademark Office*